BUSY LINE CALL TRANSFER SYSTEM

Filed Aug. 6, 1963

INVENTORS: H. S. BEAN
T. V. BURNS
R. L. HAYES
M. KLEIN

BY R. C. Winter
ATTORNEY

BUSY LINE CALL TRANSFER SYSTEM

Filed Aug. 6, 1963 9 Sheets-Sheet 2

Oct. 11, 1966 H. S. BEAN ET AL 3,278,692

BUSY LINE CALL TRANSFER SYSTEM

Filed Aug. 6, 1963 9 Sheets-Sheet 5

BUSY LINE CALL TRANSFER SYSTEM

Filed Aug. 6, 1963 9 Sheets-Sheet 6

BUSY LINE CALL TRANSFER SYSTEM

Oct. 11, 1966 H. S. BEAN ET AL 3,278,692

BUSY LINE CALL TRANSFER SYSTEM

Filed Aug. 6, 1963 9 Sheets-Sheet 9

3,278,692
BUSY LINE CALL TRANSFER SYSTEM
Henry S. Bean, Keyport, N.J., Thomas V. Burns, Etna Township, Licking County, Ohio, and Richard L. Hayes, Red Bank, and Milton Klein, Lincroft, N.J., assignors to Bell Telephone Laboratories, Incorporated, New York, N.Y., a corporation of New York
Filed Aug. 6, 1963, Ser. No. 300,369
12 Claims. (Cl. 179—18)

This invention relates generally to switching equipment in an automatic telephone system and particularly to switching equipment which automatically transfers incoming calls to an associated line whenever an originally called line is busy.

In earlier telephone systems of the direct progressive type, a direct correspondence existed between the called directory number and the called line equipment location. Such systems employed switches designed to seek out or "hunt" for an idle path to a succeeding series of switches or to a called line. As a result of the correspondence between directory number and equipment location, coupled with the hunting capabilities of the final switch, such systems were readily adapted to provide automatic completion of a call to a second choice line in the event of a busy condition of a first called line. However, as telephone systems increased in sophistication, the direct progressive system was essentially replaced by the well-known common control type system of the present day. An inherent feature of common control systems is the complete disassociation which exists between the directory number and the equipment location of the subscriber's line. Since the subscriber's line location is independent of the directory number in such systems, a translating device, commonly called a number group circuit, is provided to translate the called directory number into information indicating the called line equipment location.

This arrangement is satisfactory where each directory number has only one corresponding equipment location. However, it is frequently necessary to assign a plurality of equipment locations to a single directory number. For example, each PBX (private branch exchange) within a central office area usually has a number of conductor pairs interconnecting the PBX and the central office to provide access for originating and terminating service to the subscribers served by the PBX. Such pairs are utilized for terminating calls from the central office to the PBX subscribers in one of several ways: through an operator position at the PBX switchboard; via switching equipment at the PBX; or, as recently provided, by a direct termination to the associated PBX subscriber station. It is, of course, obvious that where the connections are completed through a PBX switchboard or via switching equipment, such conductor pairs are, in effect, trunk lines, while lines directly terminated to stations are equivalent to conventional private lines. In any event, all such conductor pairs are treated in essentially the same fashion as conventional private lines since each call is terminated to the PBX in response to the dialing of a subscriber directory number. The main departure from conventional treatment arises from the fact that since more than one line location is assigned to a particular directory number, the number group circuit must be equipped to recognize this fact and to thereupon cause the testing of the group of lines assigned to the directory number for an idle condition before making a definite translation.

A telephone system which provides such an arrangement is disclosed in the A. J. Busch Patent No. 2,585,904, issued February 19, 1952. The Busch patent teaches this circuit arrangement, commonly called terminal hunting, with only a single limitation, namely, that only one such PBX number may be assigned within a series of ten consecutive numbers. A subsequently issued Patent No. 2,706,749, dated April 19, 1955 to M. E. Krom, obviated this limitation effectively, by providing first means operated in accordance with the tens digit of a registered directory number to identify a group of numbers including more than one PBX designation, together with second means under control of the identifying means and the units digit of the registered directory number to control the testing of the associated group of lines. Thus, in the Krom arrangement a single first means is provided for each such group of ten consecutive numbers assigned to more than one PBX and a single second means is provided for each such PBX within the block of ten numbers.

While the Krom arrangement effectively met the required need, the relatively recent increase in the number of small PBX's comprising only two lines has led to a demand for a less expensive and more efficient arrangement for providing this service. Particularly, since it will be recognized that while the Krom disclosure is very efficient for a block of ten numbers comprising only a few PBX groups, as the number of groups increases the relative economy and efficiency of the arrangement correspondingly decreases. Thus, a need exists for an arrangement which replaces the terminal hunting method of testing two-line PBX groups.

A seemingly different situation has also increased the demand for a more efficient and flexible method of terminal hunting as follows. Private line residential service has rapidly evolved to the point where such service is the rule today rather than the exception. The rapid improvement of telephone service and the resulting dependence upon the telephone by the subscriber for business and social purposes has further resulted in a high percentage of private residences being equipped with two private lines, each one frequently listed independently for different members of the household. In such situations a need arises for an efficient and economical arrangement for transferring an incoming call directed to a busy called line to an idle line at the same location. The need also exists for a flexible arrangement wherein such calls are transferred to the alternative idle line regardless of the line to which the call was originally directed.

Accordingly, it is an object of this invention to provide an economical and efficient arrangement which replaces the terminal hunting method of testing two-line PBX groups.

Another object of the invention is to provide an efficient and flexible method of completing a call to an idle line upon ascertaining the busy condition of an associated busy line.

Another object is to provide this arrangement in a simple and expedient manner without necessitating the addition of complex equipment at the associated central office.

These and other objects of the invention are attained in accordance with an exemplary embodiment wherein additional equipment is provided in the marker circuit which, as well known in the art, is a large common control circuit employed to establish the major connections between calling and called lines. The marker is arranged to receive an indication from the number group translator, in addition to the usual called line equipment location, which it translates into the units digit of the alternate line. Thus, after interrogating the number group, the marker registers the called line equipment location and the units digit of the alternative line. If the originally called line is idle, the call is completed in the conventional manner. If the originally called line is busy, the marker is arranged to recycle, and reinterrogate the number group. However, prior to so doing, the registered units digit of the called directory number is replaced by the units digit of the alternative line. As a result, upon interrogating the number group, the marker receives the equipment location information for the alternative line. A connection is then completed to the alternative line if the line is idle. If the line is busy, busy tone is returned to the calling party in the usual manner.

Therefore, in the case of a PBX number which comprises only one listed directory number, the marker receives the units digit of the second line for subsequent use, if required. Also, in the case of a residence employing two private lines, each listed separately, the marker receives the units digit of the directory number which was not dialed by the calling party, for subsequent use, if required. In the latter case, of course, each line then becomes the alternative for the other line.

Accordingly, it is a feature of this invention that a marker circuit is provided with equipment which is operative to cause completion of a call to a predetermined alternative line upon the busy condition of an associated called line.

Another feature of this invention is that equipment is provided to enable two private subscriber lines to automatically be alternative lines, one for the other, upon the busy condition of either of such lines.

Another feature of this invention is that a marker circuit is provided with equipment arranged to register at least a single digit, such as the units digit, of an alternative line in addition to the equipment location information of a called line.

Another feature of the invention is that a marker circuit is provided with equipment operative to replace the units digit of a called line with the units digit of an alternative line upon the ascertainment of a busy condition of the called line.

Another feature of this invention is that a marker circuit is provided with equipment which is operative to recognize a special service line and to inhibit the return of busy tone upon ascertaining the busy condition of such line.

Another feature of this invention is that a marker circuit is provided with equipment operative upon the busy condition of a called special service line to cause reseizure of a number group to obtain translation of an alternative directory number.

The foregoing objects and features, as well as others, of our invention will be more apparent from a consideration of the subsequent description and the drawing, in which.

It will be noted that FIG. 2 through 9 employ a type of notation referred to as "detached-contact" in which an X, shown intersecting a conductor, represents a normally open contact of a relay, and a bar, shown intersecting a conductor at right angles, represents a normally unoperated condition of a relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, closed contact of a relay—"normally" referring to the The present invention may advantageously be embodied in an automatic switching system such as the system disclosed in the A. J. Busch Patent No. 2,585,904, dated February 19, 1952. It is to be understood, however, that our invention is not limited to use in a system of this type, but may be used in any automatic switching system.

Figures 1, 10:
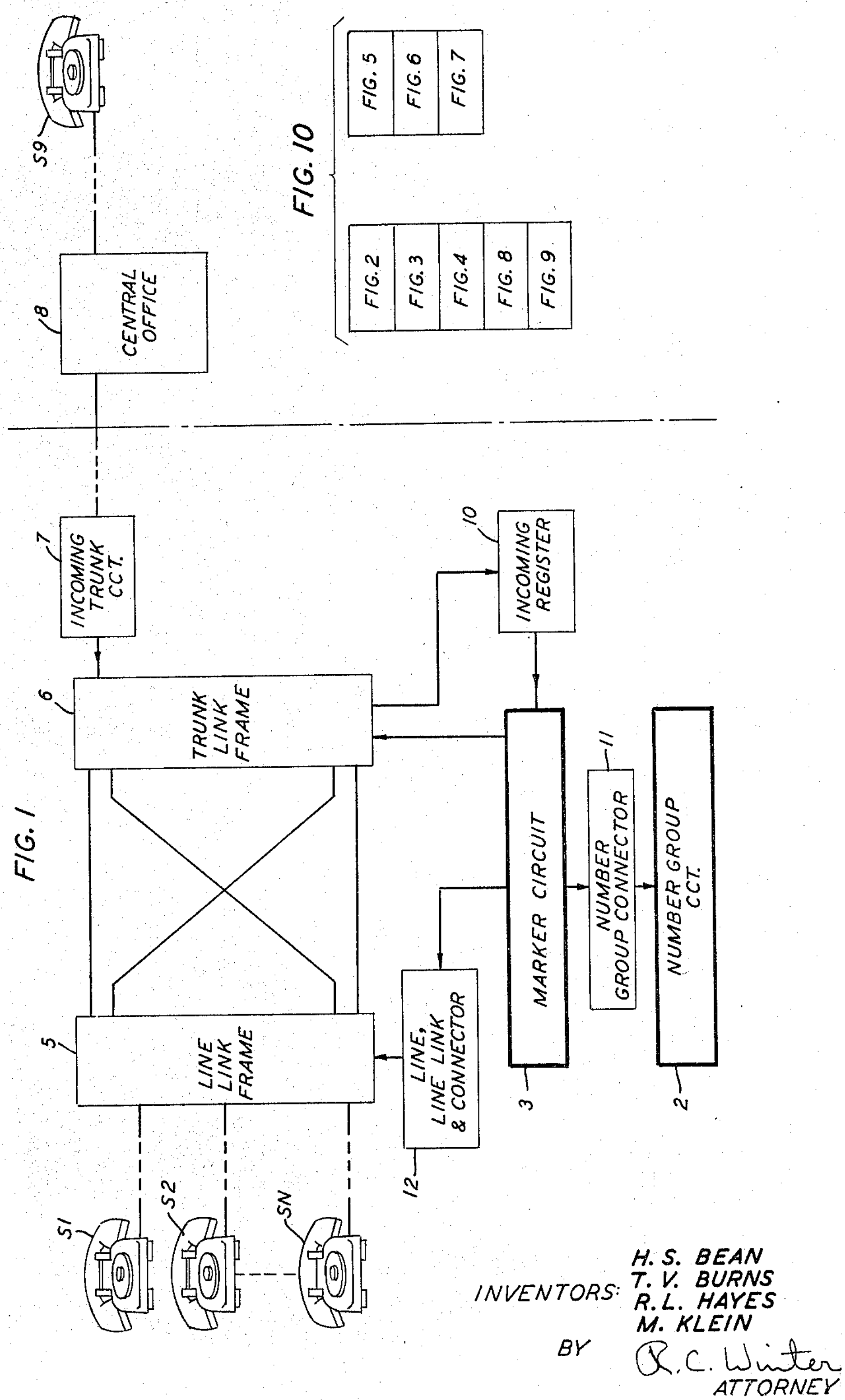
FIG. 1 is a block diagram showing the interrelation of the components of the exemplary embodiment.
FIG. 10 is a key chart depicting the position in which the various figures should be placed.

The invention described herein is particularly concerned with apparatus in marker circuit 3 and number group circuit 2 which are represented by the blocks shown with heavy lines in FIG. 1. The other equipment units are neither shown nor described in detail except where necessary for a complete understanding of the invention. The Busch patent may be consulted for a complete understanding of the construction and operation of components not covered in detail herein.

The interrelation and functions of equipment units of the exemplary embodiment will now be described with reference to FIG. 1 wherein the interconnections between circuit blocks have been designated by means of arrows to show the direction of circuit action.

1.00—*General description*

We shall assume for purpose of explanation that stations S1 and S2 comprise a two-line PBX group. Thus, as is well known in the art, though only the directory number of stations S1 is published, a call directed to station S1 is directed as well to station S2 by virtue of the fact that both stations are part of the same PBX group. Assuming that station S9 desires to place a call to the PBX, the directory number associated with station S1 is dialed and, as set forth in detail in the Busch patent is transmitted from central office 8 over incoming trunk circuit 7 to the Busch system.

As further disclosed in the Busch system, an activated incoming trunk, such as trunk 7, is connected to an appropriate incoming register, such as incoming register 10. Incoming register 10 receives and registers the directory number transmitted by station S9 and subsequently transfers this information to marker circuit 3. Since marker circuit 3 receives the station S1 directory information in digital form, it is necessary to translate this digital information into the line equipment location information of station S1. This is necessary in order for marker circuit 3 to complete the connection between the appearance of incoming trunk 7 on trunk link frame 6 and the appearance of station S1 on line link frame 5.

Accordingly, via number group connector 11, marker circuit 3 seizes the appropriate number group circuit which, as disclosed in the Busch patent, is determined by the thousands digit of the called number. The marker thereupon forwards the hundreds, tens and units information of the station S1 directory number to number group 2. Number group 2 thereupon performs its translation, as set forth in Busch, and returns to marker 3 the corresponding line location information of station S1. In addition, in the instant embodiment, number group 2 is arranged to return to marker 3 the units digit which, though unpublished, is assigned to station S2. Digressing momentarily, it will be noted that in order to facilitate clarity of presentation of the instant embodiment, only the manner in which the alternative line units digit is made available for subsequent use, if required, is disclosed in detail. It will be obvious from that which is contained hereinafter that the invention is not restricted to an arrangement involving only the units digit, but could, in fact, include any other digit or digits of the alternative line directory number.

Proceeding now with the description, the marker accordingly receives and registers the line location information for station S1 and the units digit for station S2. Marker 3 then proceeds to establish a connection between incoming trunk circuit 7 and station S1 as described in detail in the Busch patent.

If station S1 is idle, the connection is completed and ringing takes place in the conventional manner. However, if station S1 is busy, i.e., involved on another connection at this time, the marker detects this fact and, recognizing that station S1 is a special service PBX line, recycles. In recycling, the marker releases the previously seized line link frame and also releases the previously received line location information of station S1. Marker 3 thereupon reseizes number group 2; but immediately prior to so doing as will be more apparent hereinafter, the marker replaces the units digit of the directory number originally received with the units digit of station S2 as previously provided by number group 2. Thus, in essence, the marker assembles the directory number of station S2 at this time. Number group 2 thereupon performs a translation of the directory number of station S2 and returns to marker 3 the line location information for that station.

In the instant embodiment station S2 is shown for the purpose of clarity as being terminated on line link frame 5. It is, of course, obvious that stations S1 and S2 are not so restricted to being terminated on the same line link frame, but rather, in practice, may well be terminated on different line link frames.

Having received the line link information for station S2 from number group 2, marker 3 proceeds to establish a connection between incoming trunk circuit 7 and station S2 as set forth in detail in the A. J. Busch patent. If station S2 is idle at this time, the connection is completed in the usual manner. If station S2 is not idle at this time, marker circuit 3 detects this fact and causes the return of busy tone to station S9. In either event, marker 3 thereupon releases so as to be available on other calls.

As will be more apparent from that which is contained hereinafter, if stations S1 and S2 are not PBX lines, but rather are two stations at a residential location each comprising a different published directory number, number group 2 may be arranged upon being interrogated for the line equipment location of station S1 to also return the units digit of station S2 for subsequent use in a similar fashion to that described above for PBX lines. And conversely number group 2 may be arranged when interrogated as to the line equipment location of station S2 to return the units digit of station S1 for subsequent use in a similar manner, if station S2 should be busy.

Also, as will be more apparent from the details contained hereinafter, a station, such as SN, may be arranged as the alternative line for two separate and distinct PBX lines such as stations S1 and S2. Thus, when station S1 is busy, subsequent incoming calls are directed to station SN and, in a similar fashion, when station S2 is busy, subsequent incoming calls are directed to station SN.

Reference will now be made to FIGS. 2 through 9 in order to describe in detail the operation of the exemplary embodiment.

2.00—*Detailed description*

FIGS. 2 through 9 should be arranged as shown in FIG. 10 in order to facilitate an understanding of the detailed description contained hereinafter. The detailed description will be concerned with incoming calls terminated at stations on line link frame 5. It will be obvious from the details contained hereinafter that the instant arrangement applies equally as well to other types of calls. The invention, as manifested by the instant embodiment, requires an explanation of changes made in the Busch system marker circuit and number group circuit. Accordingly, the following description will pertain primarily to the explanation of the operation of these two circuits, all other circuit functions being similar to that described in detail in the A. J. Busch patent.

In order to simplify the drawings, certain relay contact designations have been enclosed by parentheses in order to indicate that the associated relay winding operate path is shown in detail on the aforesaid Busch patent drawings and is not repeated herein.

We shall assume that a call is originated at station S9, FIG. 1, and is directed to station S1, which we shall further assume is the first line of a two-line PBX group. Operations proceed as described in the Busch patent to the point where incoming register 10 forwards the called line information to marker circuit 3. As set forth in the Busch patent, marker circuit 3 registers this information and, upon recognizing that this is a call which is to be completed within the office, seizes the appropriate number group. If we assume that the called PBX number is BA9–2780, then the BA9 designation identifies this particular central office and the 2780 identifies the particular line within the office. As set forth in the Busch patent, each number group is capable of translating 1,000 directory numbers. Since the thousands number in the instant case comprises the digit 2, the marker seizes number group 2 via number group connector 11.

2.01—*Number group translation*

After seizing number group 2, the marker forwards the called number hundreds, tens, and units digit information to that circuit. As further disclosed in detail in the Busch patent, number group 2 returns to marker 3 the calling line location in terms of the line link frame number, vertical group, horizontal group, and vertical file information. The marker also receives an indication representing the assigned ringing combination for the particular line.

As described hereinbefore, the instant embodiment requires that an additional bit of information comprising the units digit of the alternative line also be returned. Therefore, the instant embodiment may advantageously incorporate means for providing additional translation indications from the number group which do not necessitate the provision of additional conductors. Such an arrangement is disclosed in detail in application Serial No. 240,558 filed on November 28, 1962 by T. V. Burns et al. This arrangement is disclosed generally beginning on page 26, line 28, and continuing through page 28, line 12; and is disclosed in detail beginning on page 31, line 20, and continuing through page 36, line 26 of that application. Accordingly, that portion of the Burns application is made a part of this specification as though repeated in detail herein. It will be evident from that which is contained hereinafter that, though the instant invention may be facilitated by employing such an arrangement, the invention is not dependent thereon.

Figure 2:
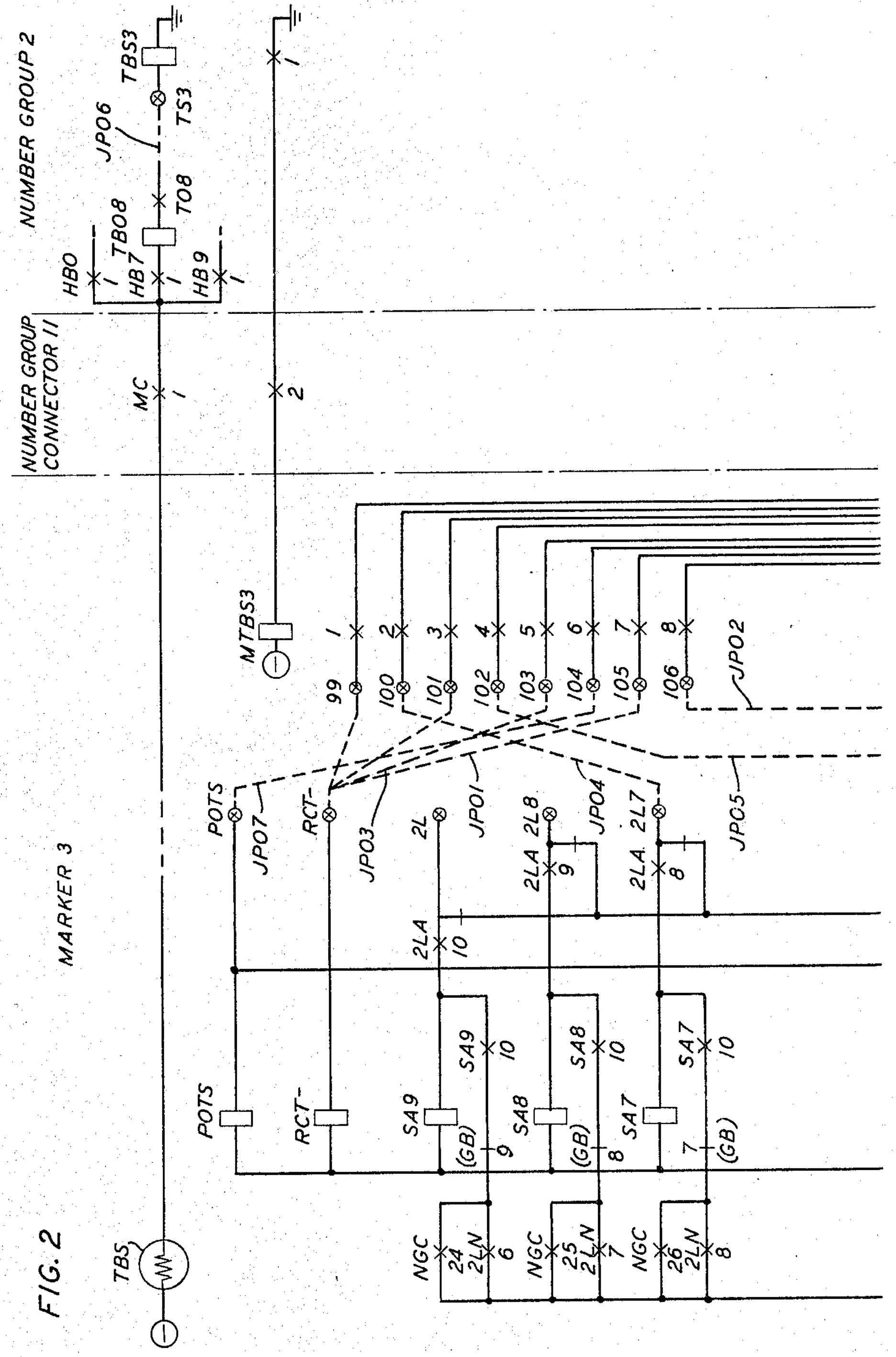
FIG. 2 through 9 are diagrams in schematic form showing in greater detail the interrelation of the components of the exemplary embodiment.

As set forth in the Burns application, in addition to returning the line equipment location information, the tens block relay of number group 2 may advantageously be arranged to operate an associated TBS relay. We shall assume, as shown in FIG. 2, that the TBO8 relay in number group 2 is cross-connected via jumper JPO6 to the TS3 punching. Negative battery is then extended through the TBS resistance lamp, number group connector MC contacts, and through the TBO8 and TBS3 relays to ground so as to operate relays TBO8 and TBS3 in series. Enabled make contact 1 of TBS3 completes an obvious path for operating relay MTBS3 in marker 3.

Figure 3:
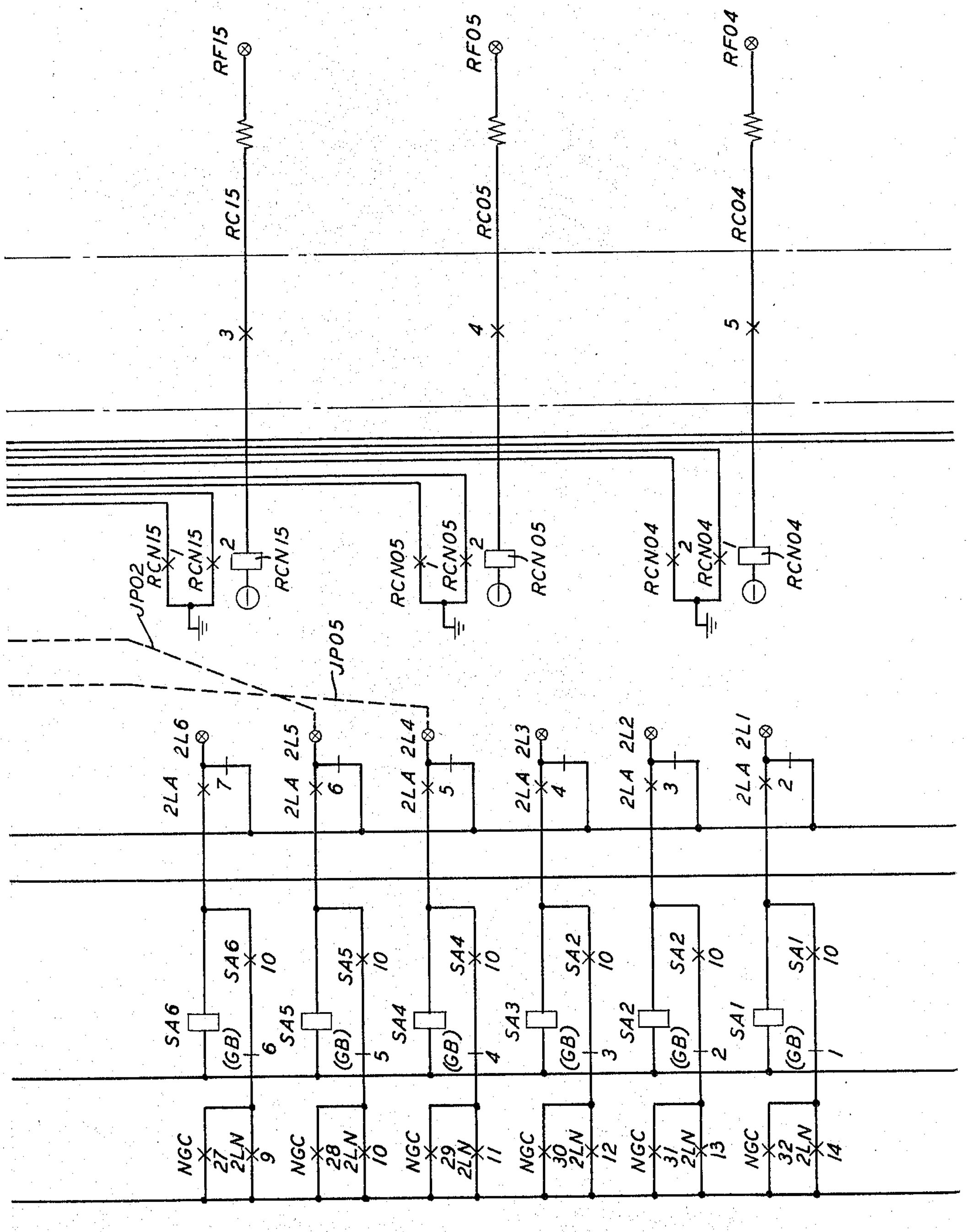

In addition, the units digit zero of the called number may be arranged, as described in the Burns application, to cause the return of a ground indication on an associated RF punching, such as RF15, FIG. 3, so as to complete the obvious operate path of relay RCN15. The operation of relay MTBS3, FIG. 2, and RCN15, FIG. 3, provide ground by an obvious circuit to punchings 105 and 106, FIG. 2. These punchings may advantageously be arranged in the instant embodiment so as to extend this ground via jumpers JPO1 and JPO2, to the RCT- punching and the 2L5 punching, respectively. The RCT- relay, FIG. 2, accordingly operates to provide the ringing combination information required by the marker for the completion of the call. As will be more apparent hereinafter, the grounding of the 2L5 punching, FIG. 3, indicates that the unpublished but assigned units digit of the alternative line is the digit 5. It should be noted that this additional bit of information is received concurrently with the equipment location information as set forth in the Busch patent.

Figure 4:
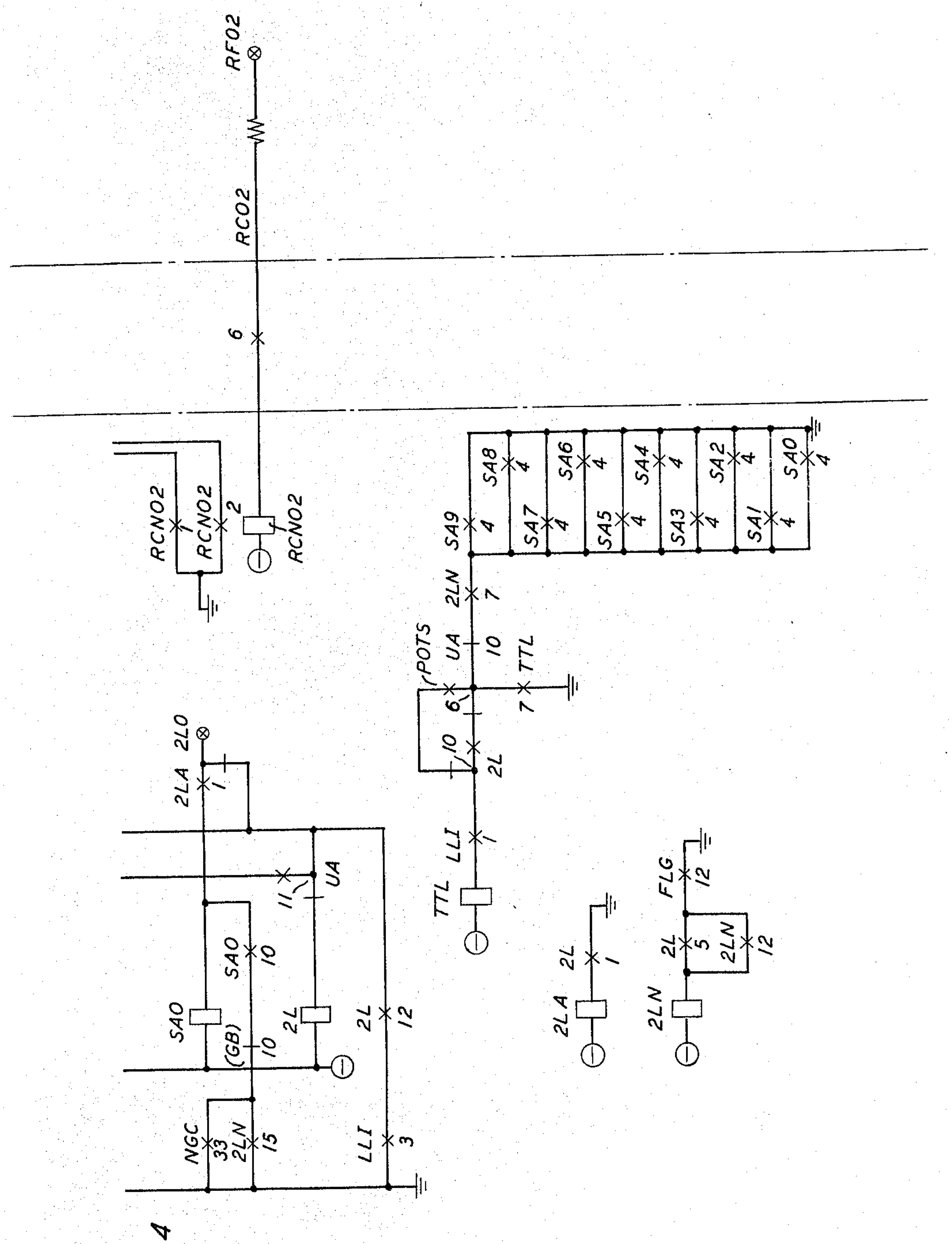
Figure 5:
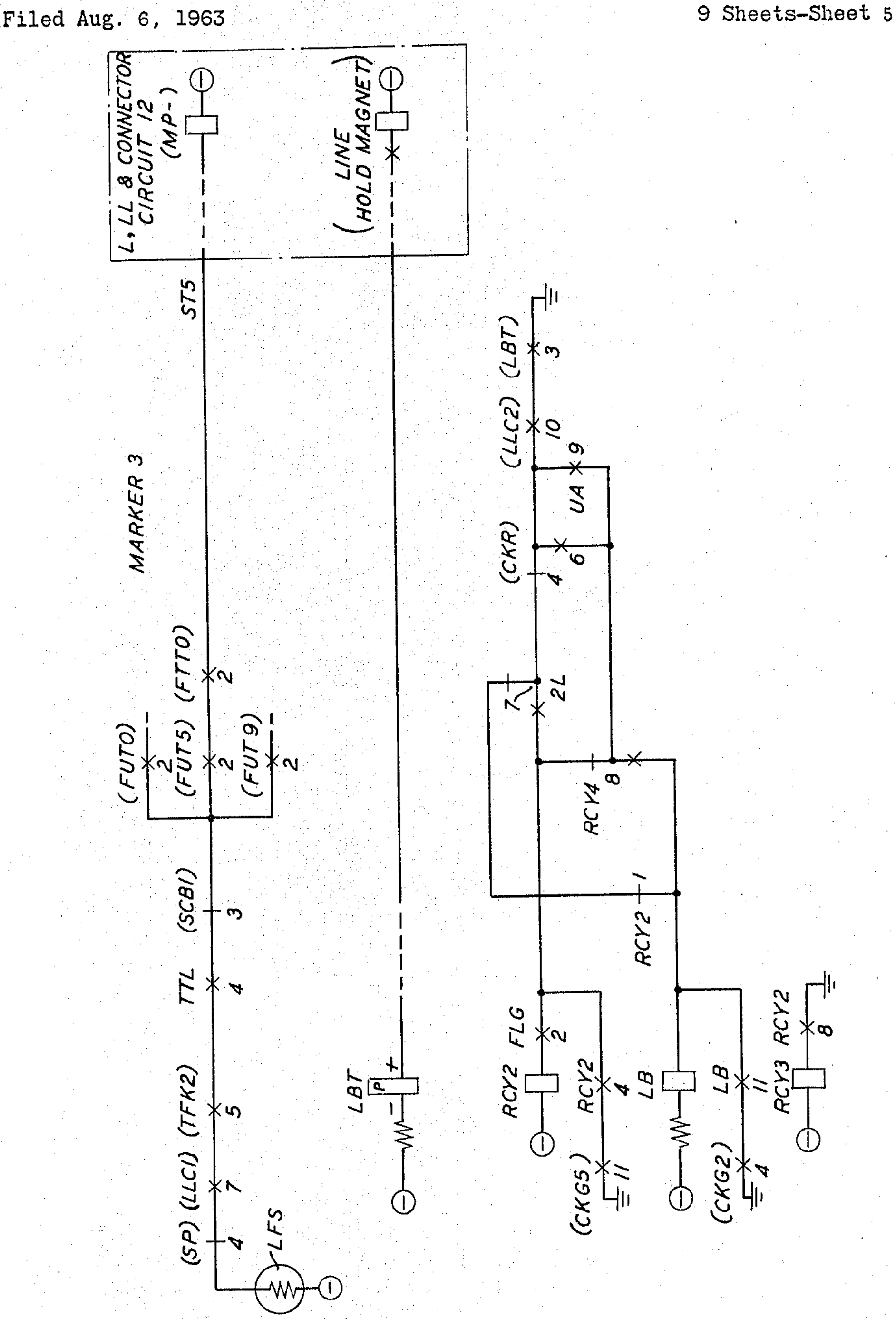
Figure 6:
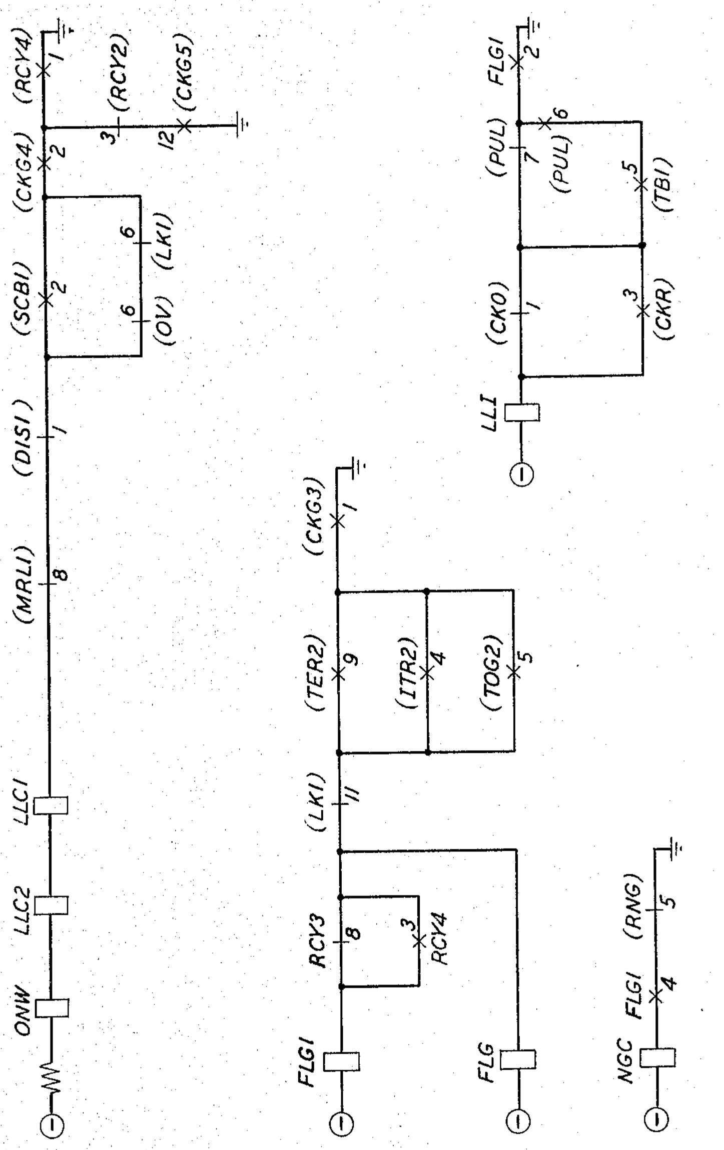

The grounding of punching 2L5 completes the operate path of relay 2L, FIG. 4, through the released break contact 6 of relay 2LA and released break contact 11 of relay UA. Accordingly, relay 2L operates, completes its own locking path which extends through make contact 12 of relay 2L and make contact 3 of relay LL1 to ground. The operation of make contact 1, FIG. 4, of relay 2L completes the operate path of relay 2LA.

The operation of relay 2L, via its make contact 5, FIG. 4, also completes the operate path of relay 2LN which extends through the previously operated make contacts 12 of relay (FLG). Relay 2LA in operating enables its transfer contacts 5, FIG. 3, so as to extend the ground present in punching 2L5 to the winding of relay SA5, which operates and thereupon locks operated through make contact 10 of SA5, break contact 5 of relay (GB) and make contact 10 of relay 2LN to ground. Relay TTL operates at this time via negative battery which extends through the TTL winding, operated make contact 1 of relay LL1, operated make contact 10 of relay 2L, released break contact 10 of relay UA, operated make contact 7 of relay 2LN, and through operated make contact 4 of relay SA5 to ground. The operation of relay TTL indicates that the marker has received and registered the units digit of the alternative line for a two-line PBX group. Marker 3 thereupon causes the release of number group 2 as set forth in the Busch patent.

Having thus registered all the information required to complete a connection between the appearance of incoming trunk 7 on trunk link frame 6 and the line appearance of station S1 on line link frame 5, the marker seizes line link frame 5 as set forth in the Busch patent. Accordingly, as shown on FIG. 5, and described in detail in the Busch patent, negative battery is extended through the LFS resistance via the ST5 lead for marker 3 to operate the appropriate MP- relay in the line, line link and connector circuit 12. As further described in the Busch patent, line link frame 5 is thereby seized and the marker proceeds to perform the necessary tests required to complete the connection. If station S1 is idle at this time, the connection is completed to that station and the marker releases in the conventional manner. However, referring to FIG. 5, if station S1 is busy at this time, relay LBT operates, as set forth in the Busch patent, to indicate the busy condition. It should be noted at this point that if this were a call to a conventional line, the marker would cause the return of busy tone. However, in the instant embodiment the operation of relay LBT causes the operation of relay RCY2 by extending positive ground through operated make contact 3 of relay LBT, make contact 10 of relay LLC2, released break contact 4 of relay CKR, operated make contact 7 of relay 2L, operated make contact 2 of relay FLG through the winding of RCY2 to negative battery. Relay RCY2 accordingly operates at this time and locks to ground through operated make contact 2 of relay FLG, operated make contact 4 of RCY2, and operated make contact 11 of CKG5 to ground.

As will be more apparent hereinafter, the operation of relay RCY2 causes the marker to recycle and thereby place itself essentially in the same condition as it was prior to the seizure of number group circuit 11.

Relay RCY3 operates by an obvious circuit path which extends through operated make contact 8 of relay RCY2. As disclosed in detail in the Busch patent, relays ONW, LLC1, and LLC2, FIG. 6, control the functions associated with line link frame seizure. The operate path of these relays is extended through break contact 3 of relay RCY2 to positive ground present on operated make contact 12 of relay CKG5. Accordingly, the operation of break contact 3 of relay RCY2 at this time causes the release of relays ONW, LLC1, and LLC2. All operated relays which are controlled by the aforesaid three relays are therefore restored to normal. Line link frame 5 and the associated connectors are accordingly released by marker 3. The operation of break contact 8 of relay RCY3 serves to release relay FLG1 by an obvious circuit. The release of make contacts 2 of relay FLG1 is arranged to release relay LL1 by an obvious circuit. As disclosed in detail in the Busch patent, the release of relay LL1 causes the release of the line location information previously registered in marker circuit 3. The release of make contact 4 of relay FLG1 also opens the operate path of relay NGC, releasing it.

Summarizing at this time, upon receiving the directory number of station S1, the marker has interrogated number group circuit 2 and has received the line equipment location of the called line, the associated ringing combination information, and the units digit of the alternative line. We have assumed that in attempting to establish a connection to station S1, station S1 was found to be busy. The marker thereupon recycled, released the previously seized line link frame and erased the line location information and ringing combination information initially received from the number group.

The following description in this subsection will describe the manner in which the marker reinterrogates the number group utilizing the originally received thousands, hundreds and tens digit information in conjunction with the alternative line units digit information received from the number group as a result of the first translation.

Figure 9:
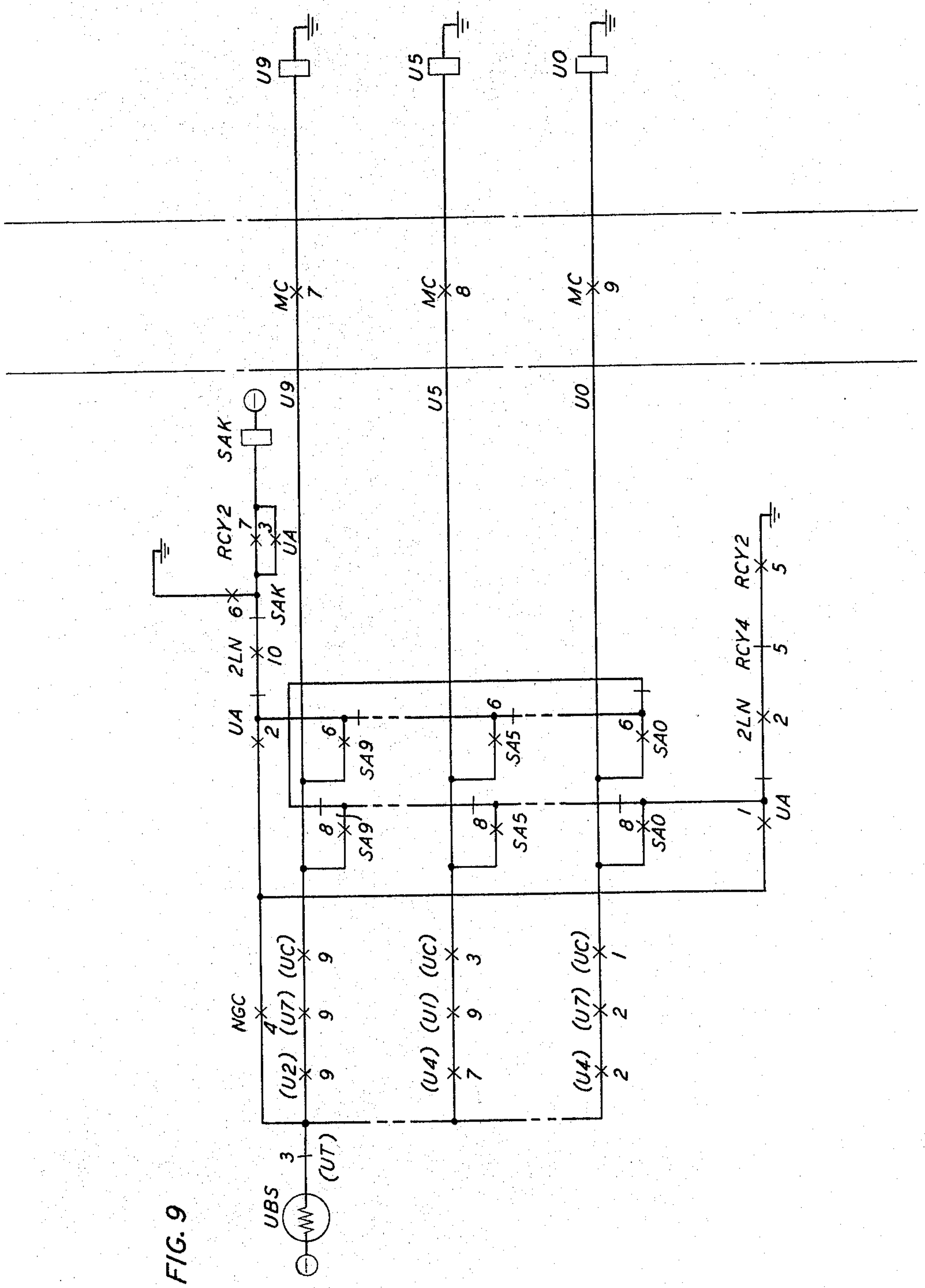

Relay SAK, FIG. 9, operates by negative battery, extended through the SAK winding, operated make contact 7 of relay RCY2, released break contact 6 of relay SAK, operated make contact 10 of relay 2LN, released break contact 2 of relay UA, and through a chain of transfer contacts on relays SA9 through SA6, and is extended via operated make contact 6 of relay SA5, operated make contact 8 of relay SA5, through a chain of released break contacts 8 on relays SA4 through SA0, via released break contact 1 of relay UA, operated make contact 2 of relay 2LN, released break contact 5 of relay RCY4 and operated make contact 5 of relay RCY2 to positive ground. Relay SAK accordingly operates as a check of the operation of the required control relays in conjunction with a single SA- relay indicating the alternative units digit.

Figure 7:
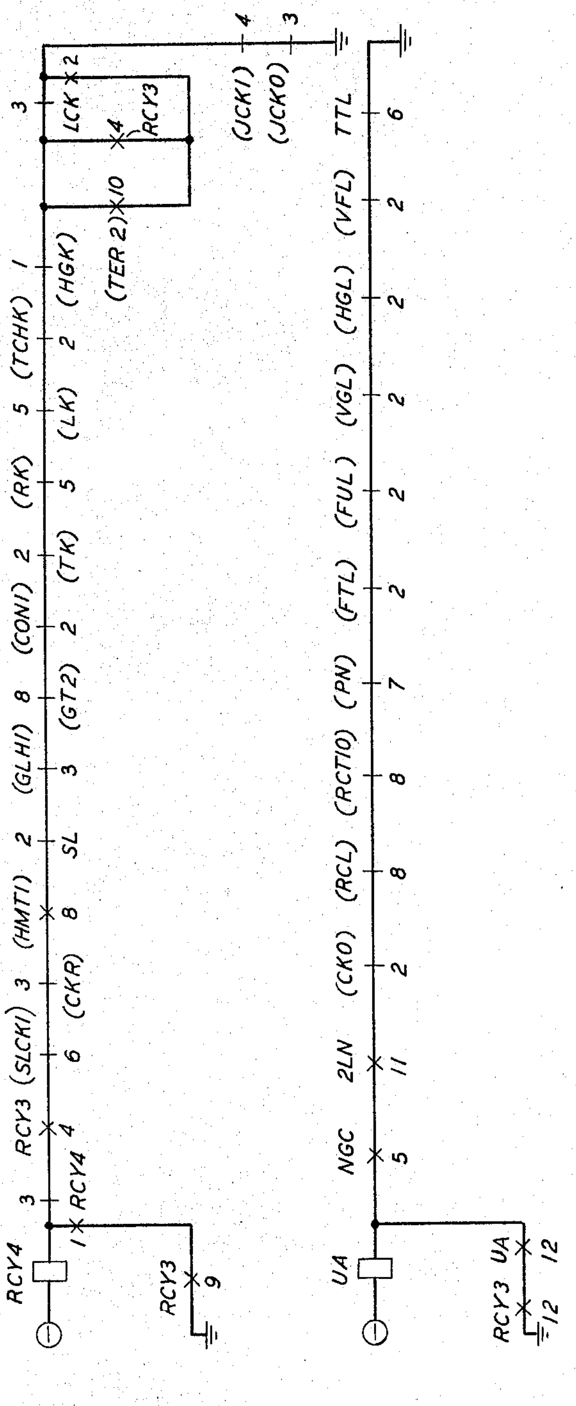
Figure 8:
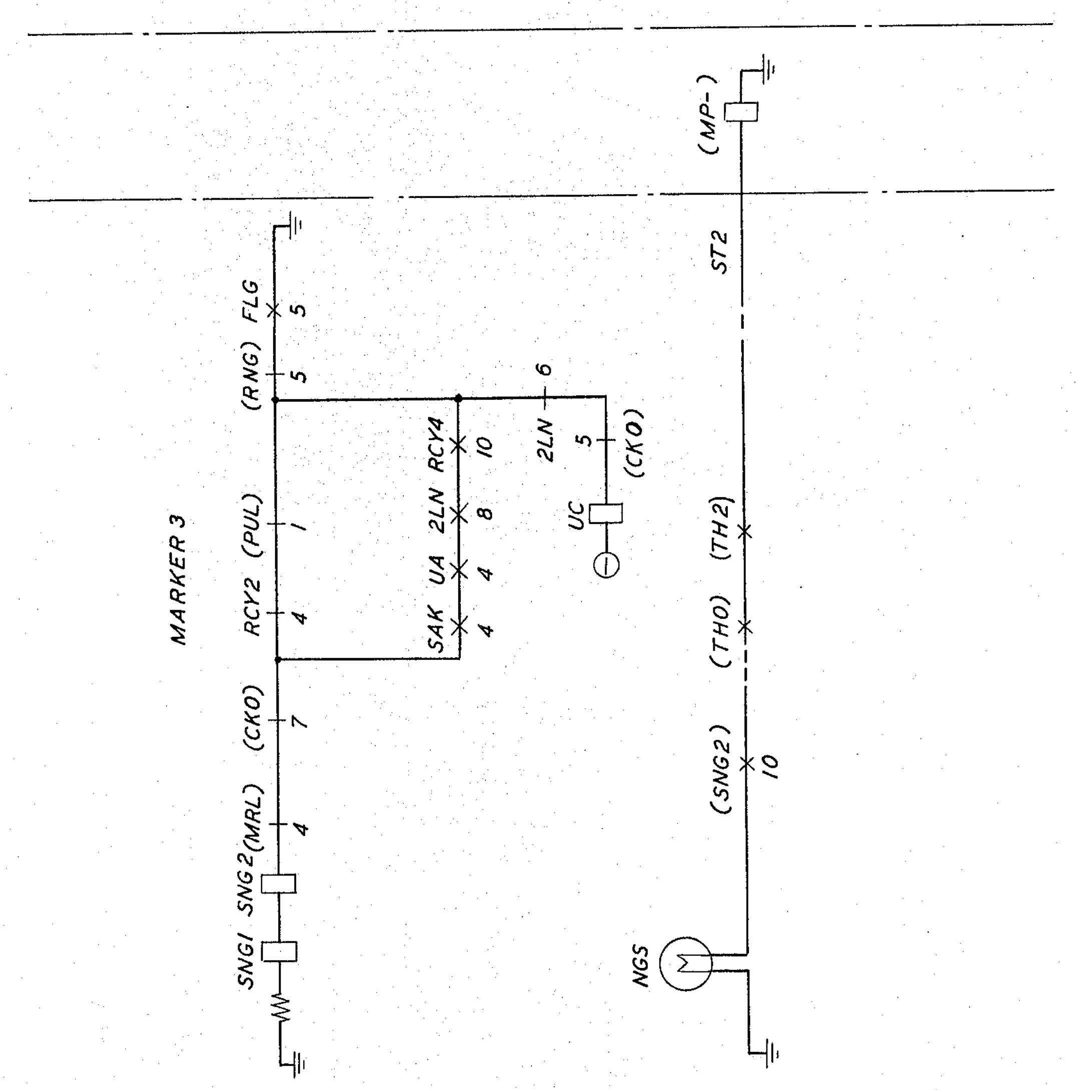

Relay RCY4, FIG. 7, also operates at this time via negative battery extended through the winding of RCY4, released break contact 3 of RCY4, operated make contact 4 of RCY3, released break contact 6 of (SLCK1), released break contact 3 of (CKR), released make contact 8 of (HMT1), released break contact 2 of relay (SL), released break contact 3 of relay (GLH1), released break contact 2 of relay (GT2), released break contact 2 of relay (CON1), released break contact 2 of relay (TK), released break contact 5 of relay (RK), released break contact 5 of relay (LK), released break contact 2 of relay (TCHK), released break contact 1 of relay (HGK), released break contact 3 of relay (LCK), released break contact 4 of relay (JCK1), released break contact 3 of (JCKO) to positive ground.

Thus, relay RCY4, in operating, indicates the completion of the recycle function. Relay RCY4 locks operated through make contact 2 of RCY4 and make contact 9 of RCY3 to positive ground.

The operation of make contact 3 of relay RCY4 completes the previously opened operate path of relay FLG1 by an obvious circuit. The operation of relay FLG1 also again completes the operate path of relay NGC.

It remains at this time but to replace the units digit originally received with the units digit of the alternative line. Accordingly, the units add relay UA, FIG. 7, operates from negative battery extended through the UA winding through operated make contact 5 of relay NGC, operated make contact 11 on relay 2LN and to ground through a chain of released break contacts of relays (CKO), (RCL), (RCT10), (PN), (FTL), (FUL), (VGL), (HGL), (VFL), and TTL.

As described in detail in the Busch patent, in order for the initially received digits information of the called directory number to be transmitted to the number group, relay UC must be operated. The operate path of relay UC, FIG. 8, may advantageously be extended through break contact 6 of relay 2LN so as to prevent the opera-

2.03—*A common alternative line for a plurality of separate and distinct lines*

It may be advantageous in certain situations for two or more distinct PBX groups, each comprising two lines, to have one of such lines in common. This advantage may also be extended in certain cases to residential locations as well. Thus, for example, as shown on FIG. 1, stations S1 and S2 may each include station SN as the second line in their respective two-line PBX groups.

Referring now to FIG. 4, as disclosed in detail in the Busch patent, more than one directory line may cause ground to be applied to the same RF- terminal in number group 2. It is obvious that two digits, such as the units digits 7 and 9, may each be arranged to ground the same RF- terminal such as RFO2. Accordingly, in each instance relay RCNO2 would be operated resulting in the grounding of punching 102 in marker circuit 3. As described earlier, the ground on punching 102 may advantageously be extended by JPO5 to punching 104 so as to cause the operation of relay SA4.

Thus, for the dialing of the units digit 7, i.e., BA9–2787 which may be the assigned directory number of station S1, and also for the dialing of the digit 9, i.e., BA9–2789; each such number may be arranged to result in the grounding of the 2L4 punching in marker circuit 3, thereby indicating that in each case the alternative directory line number is BA9–2784 which is the assigned directory number of station SN. Therefore, in each instance the call would progress as hereinbefore described for a single PBX group.

3.00—*Conclusion*

While the equipments of this invention have been described with reference to a particular embodiment in an arrangement whereby a call directed to a particular line is automatically directed to an associated line whenever the particular line is in a busy condition, it is to be understood that such an embodiment is intended to be illustrative of the present invention and that numerous other arrangements may be devised by those skilled in the art without departing from the spirit and scope of the invention. For example, it is obvious that the stations comprising a group having the features set forth in the specification are not restricted to the same general physical location, but could, in fact, comprise stations located at any distance from each other.

What is claimed is:

1. In a telephone system,
a plurality of lines each assigned a distinct numerical designation,
a common control circuit comprising means for establishing connecting paths between said lines as determined by said numerical designation,
certain of said lines arranged in groups of two wherein the numerical designation differs only in the assigned units digit,
translating means seizable by said common control means and responsive to the numerical designation of the first line in any of said groups for informing said common control circuit of the units digits of the second line in said group, and
said common control means further comprising means responsive to a busy condition of said first line for completing a connection to said second line.

2. In a telephone system,
a plurality of subscriber lines each assigned a distinct called line numerical designation and an individual line location,
certain of said lines assigned in groups of two wherein each line designation within each group differs only in the assigned units digit,
means for translating a line designation into a line location, and
control means responsive to the registration of a called line designation including the units digit of a first line in one of said groups for seizing said translating means to obtain the line location of said first line,
said translating means comprising means operable in response to the receipt of said called line designation from said control means for registering in said control means the line location of said first line and the units digit of the line designation of the second line in said one group, and said control means comprising completing means responsive to an idle condition of said first line for completing said call to said first line.

3. In a telephone system, the combination set forth in claim 2 wherein said control means further comprises means responsive to a busy condition of said first line for releasing the registration of said first line location,
means for disabling the registration of said first line units digit,
means for enabling the registration of said second line units digit,
means for reseizing said translating means to obtain the line location of said second line, and
means for enabling said completing means for completing said call to said second line.

4. In a telephone system, the combination set forth in claim 3 further comprising
a calling line,
means controlled by said control means responsive to a busy condition of said second line for returning a busy line indication to said calling line, and
said control means further comprising means responsive to a busy condition of said first line for inhibiting the return of said busy line indication to said calling line.

5. In a telephone system,
a plurality of subscriber lines each assigned a distinct called line numerical designation and an individual line location,
certain of said lines assigned in groups of two wherein each line designation within each group differs only in the assigned units digit,
certain of said groups including a predetermined one of said lines in common as the second line of said groups,
means for translating a line designation into a line location,
control means operatively responsive to the registration of a called line designation including the units digit of a first line in any one of said certain groups for seizing said translating means to obtain the line location of said first line,
said translating means comprising means operable in response to the receipt of said called line designation from said control means for registering in said control means the line location of said first line and the units digit of the line designation of the second line in said one group,
said control means comprising means responsive to a busy condition of said first line for replacing the registration of said first line units digit therein with the registration of said second line units digit,
means for reseizing said translating means to obtain the line location of said second line, and
means for completing the call to said second line.

6. In a telephone system,
a plurality of lines each assigned a distinct numerical designation,
a common control circuit comprising means for establishing connecting paths between said lines as determined by said numerical designations,
translating means seizable by said common control means and responsive to the numerical designation of one of said lines for informing said common control circuit of the numerical designation of another of said lines, and said common control means further comprising means responsive to a busy condition of said one line for completing a connection to said other line.

tion of relay UC when the marker reinterrogates the number group during the course of a call to a two-line PBX group.

Relays SNG1 and SNG2 operate at this time by negative battery which extends through their windings in series, through released break contact 4 of (MLR1), released break contact 7 of relay (CKO), operated make contact 4 of relay SAK, operated make contact 4 of relay UA, operated make contact 8 of relay 2LN, operated make contact 10 of relay RCY4, released break contact 5 of relay (RNG), and operated make contact 5 of relay (FLG) to positive ground. As disclosed in detail in the Busch patent, the operation of relay SNG2 extends negative battery via the ST2 lead to number group connector 11 so as to cause the seizure of number group 2. As further described in the Busch patent, the calling line directory information is thereupon forwarded to the number group for translation. In the instant embodiment the hundreds and tens digit information is forwarded exactly as described in the Busch patent and therefore that description will not be repeated herein. The following will describe, however, the manner in which the alternative units digit is forwarded to the number group.

Referring now to FIG. 9, negative battery is extended through the UBS resistance lamp, released break contact 3 of relay UT, operated make contact 4 of relay NGC, operated make contact 1 of relay UA, through released break contact 8 of SA0, operated make contact 8 of relay SA5 and via the U5 lead to number group connector 11 so as to operate the units digit 5 relay U5 in number group 2.

Referring now to FIG. 2 and as described in the aforementioned Burns et al. application, since the digit of the alternative line is in the same tens block as the originally dialed line, when the number group completes its translation, relay TBO8 will reoperate and, accordingly, cause the operation of relays TBS3 and MTBS3. However, number group circuit 2 may be arranged for this particular units digit to return positive ground via the RCO4 lead so as to operate relay RCNO4. Ground is therefore extended from operated make contact 1 of relay RCNO4 through operated make contact 5 of MTBS3 to punching 103 which may advantageously be arranged via umper O3 so as to operate relay RCT- in marker circuit 3 thereby indicating the ringing combination that should be applied to the line. In a similar manner, ground on punching 104 may be extended via jumper JPO7 so as to cause the operation of relay POTS to indicate that the call is to be completed to the alternative line without further special treatment.

As described in detail in the Busch patent, the number group forwards the calling line equipment location of the received directory number which, in the instant case as described hereinbefore, is comprised of the assigned directory number for station S2. Therefore, the marker releases number group 2 and proceeds to establish a connection to station S2 in a manner similar to that described for station S1. If station S2 is idle at this time, the connection is completed and the marker releases in the conventional fashion. However, if station S2 is busy at this time, relay LBT will again be operated as described for station S1. However, at this time, as shown on FIG. 5, positive ground is extended through operated make contact 3 of relay LBT, operated make contact 10 of LLC2, make contact 9 of relay UA through operated make contact 7 of RCY4 through the winding of relay LB to negative battery. Accordingly, relay LB operates at this time to indicate the line busy condition of the called line. As set forth in detail in the Busch patent, the operation of relay LB causes the return of busy tone to the calling subscriber.

2.02—*A call directed to a residence having two published directory numbers*

For purpose of explanation, we shall assume at this point that stations S1 and S2 comprise two individually listed private stations at a single residential location. We may further assume that the directory number for station S1 is BA9–2784 and that the directory number for station S2 is BA9–2787.

Referring now to FIG. 2, as described in the preceding paragraph, since the dialed tens digit is eight, relay TBO8 is operated in number group 2, thereby causing the operation of relays TBS3 in number group 2 and relay MTBS3 in marker circuit 3. Also in the same manner as hereinbefore disclosed in detail, the dialing of a directory number comprising the units digit 4 may advantageously be arranged to cause the grounding of the RCO5 lead from number group 2 to marker circuit 3.

Accordingly, relay RCNO5 operates in marker circuit 3, thereby extending ground to punchings 99 and 100. The ground on punching 100 may advantageously be extended by jumper JPO4 to punching 2L7. Thus, at this point a call directed to station S1, as manifested by the directory number BA9–2784, causes the equipment line location information for that directory number to be returned to marker 3 and also at alternative units digit 7, as manifested by the operation of relay SA7 from ground present on the 2L7 punching. The call proceeds exactly as described hereinbefore for a two-line PBX group and, if a line busy condition is encountered at station S1, the alternative units digit seven would be utilized to steer the call to station S2.

In the event that a call were directed initially to station S2, as manifested by the dialing of the directory number BA9–2787, in a similar fashion lead RCO2 may be arranged to provide a ground to operate relay RCNO2 in consequence of the translation of the directory number for station S2. Accordingly, relay RCNO2 operates and closes a ground to punching 102 in marker circuit 3. This ground may advantageously be extended by jumper JPO5 to punching 2L4 so as to operate relay SA4. Thus, the marker has received the calling line equipment location of the directory number for station S2 and has also received the units digit for station S1 for subsequent use as hereinbefore described, in the event that station S2 should be busy.

It is, of course, obvious that each time the number group is interrogated for the equipment location of either of these lines that the units digit of the other line will also be returned. This will result in the operation of the corresponding SA- relay to indicate the alternative units digit. However, as shown on FIG. 5, the alternative units digit is only effectively used on a single recycle of the marker since, as described earlier, when a second line busy condition is encountered by the marker, relay LB is directly operated by a path which extends through make contact 7 of relay RCY4 operated. Relay RCY4, as disclosed earlier, provides a memory that the recycle function has occurred once in the course of attempting to complete the connection. Further, when the marker reinterrogates the number group to determine the equipment location of the alternative line, ground provided on the 2L- punching does not operate relay 2L. As shown on FIG. 2, the ground is switched through operated make contact 11 of relay UA so as to operate relay POTS which, as described earlier, indicates a call to a line requiring no special treatment.

Accordingly, the marker does not oscillate back and forth between lines which are alternatives for each other. But rather, after ascertaining the busy condition of both lines, returns busy tone in the conventional manner.

7. A telephone system comprising a switching network,
a plurality of communication lines each assigned a distinct called line designation and an individual line location on said network,
a register circuit for registering called line designations,
a number group circuit for translating called line designations to corresponding network line locations, and
a common control marker circuit, said marker circuit including
means responsive to the registration in said marker of a called line designation received from said register circuit for seizing said number group circuit and obtaining therefrom the corresponding called line location,
means for concurrently registering in said marker circuit a portion of another line designation,
means responsive to a busy condition of said called line location for reseizing said number group,
means responsive to said number group reseizure for assembling an alternative line designation consisting of said called line designation as modified by the substitution therein of said portion of said other line designation,
means for obtaining from said number group an alternative line location corresponding to said alternative line designation, and
means for establishing the connection through said switching network to said alternative line location.

8. In a telephone system,
the combination set forth in claim 7 wherein said marker circuit further comprises means enabled by the seizure of said number group for transmitting a called line designation to said number group,
and wherein said assembling means comprises means for enabling the transmittal of said registered portion of said other line designation and for therewith concurrently inhibiting the transmittal of the equivalent portion of said registered called line designation.

9. In a telephone system,
the combination set forth in claim 7 further comprising a calling line,
and wherein said marker circuit further comprises means responsive to a busy condition of said alternative line location for returning a busy indication to said calling line, and
means responsive to a busy condition of said called line location for inhibiting the return of said busy indication to said calling line.

10. A telephone system comprising a switching network
a plurality of communication lines each assigned a distinct called line designation and an individual line location on said network wherein certain of said communication lines are arranged in groups,
a register circuit for registering called line designations,
a number group circuit for translating called line designations to corresponding network line locations and a common control marker circuit, said marker circuit including
means responsive to the registration in said marker of a called line designation received from said register circuit for any one of said certain lines for seizing said number group circuit and obtaining therefrom the corresponding called line location,
means for concurrently registering in said marker circuit a portion of the line designation of another of said certain lines in the same group,
means responsive to a busy condition of said called line location for reseizing said number group circuit,
means responsive to said number group circuit reseizure for assembling the complete line designation of said other line in the same group by modifying said called line designation by the substitution therein of said portion of said other line designation,
means for obtaining from said number group a line location corresponding to said other line designation,
and means for establishing the connection through said switching network to said other line location.

11. A telephone system comprising a plurality of subscriber lines each assigned a distinct called line numerical designation and an individual line location,
certain of said lines arranged in groups of two wherein each line designation within each group differs only in a single assigned digit,
means for translating a line designation into a line location,
control means responsive to the registration of a called line designation of a first line in any one of said groups for seizing said translating means,
said translating means comprising means operable in response to the receipt of said called line designation from said control means for registering in said control means the line location of said first line and said single assigned digit of the line designation of the second line in said one group,
said control means comprising means responsive to a busy condition of said first line for assembling the line designation of said second line by substituting in said line designation of said first line said single assigned digit of said second line,
means for reseizing said translating means to obtain the line location of said second line, and
means for completing a call to said second line.

12. A telephone system comprising a plurality of lines each assigned a distinct numerical designation,
a common control circuit comprising means for establishing a connecting path to a first line as determined by said first line numerical designation,
translating means seizable by said common control means and responsive to said first line numerical designation for informing said common control circuit of a portion of the numerical designation of a second line, and
means in said common control circuit responsive to a busy condition of said first line for substituting said portion of the numerical designation of said second line in said numerical designation of said first line to assemble said second line numerical designation and for establishing a connecting path to said second line as determined by said thus assembled second line numerical designation.

No references cited.

KATHLEEN H. CLAFFY, *Primary Examiner.*

W. C. COOPER, *Examiner.*